United States Patent [19]

Becker

[11] Patent Number: 5,154,102
[45] Date of Patent: Oct. 13, 1992

[54] OIL FILTER REMOVAL TOOL

[76] Inventor: Jerome C. Becker, 5637 Melody Lake Dr., Edina, Minn. 55436

[21] Appl. No.: 736,002

[22] Filed: Jul. 25, 1991

[51] Int. Cl.⁵ .............................................. B67B 7/04
[52] U.S. Cl. .................................. 81/3.48; 81/176.15
[58] Field of Search ................... 81/441, 3.48, 176.15, 81/439, 461

[56] References Cited

U.S. PATENT DOCUMENTS 3,043,171  7/1962  Lederer ............................... 81/3.48
4,982,629  1/1991  Germain ........................... 81/176.15

OTHER PUBLICATIONS

Brochure entitled Oil Plate Remover, date unknown.

Primary Examiner—Frank T. Yost
Assistant Examiner—Hwei-Siu Payer
Attorney, Agent, or Firm—James W. Miller

[57] ABSTRACT

A tool for removing an oil filter has a rectangular base plate with a square ratchet receiving hole in the center of the base plate. A first pair of tangs extend downwardly from the left and right sides of the base plate at the middle thereof. A second pair of tangs extend upwardly from the front and rear sides of the base plate at the middle thereof. The tangs are spaced apart sufficiently to enter into different sized hole arrays of oil filter plates to help remove the plates if they are stuck in an engine. The tangs have sharpened outer ends to allow the tool to be driven into the oil filter body to help remove the complete filter.

12 Claims, 2 Drawing Sheets

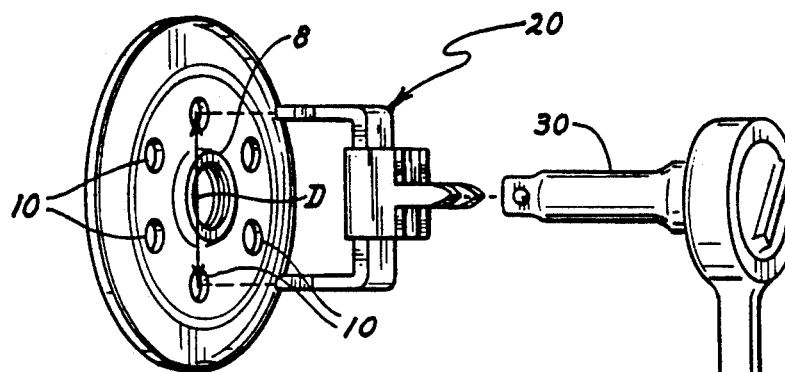
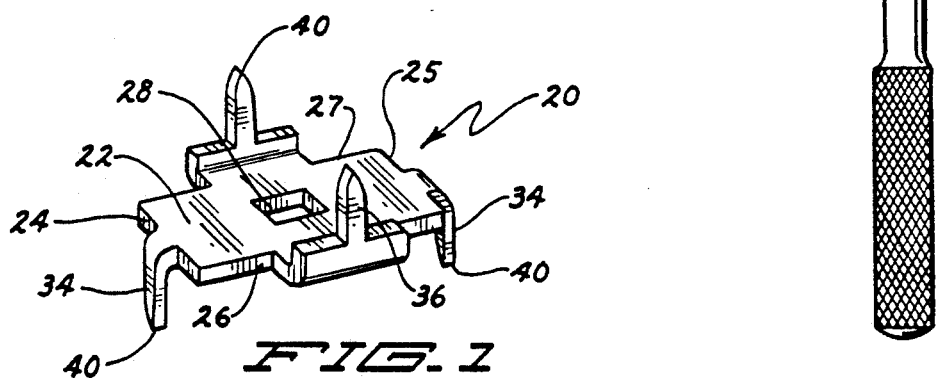
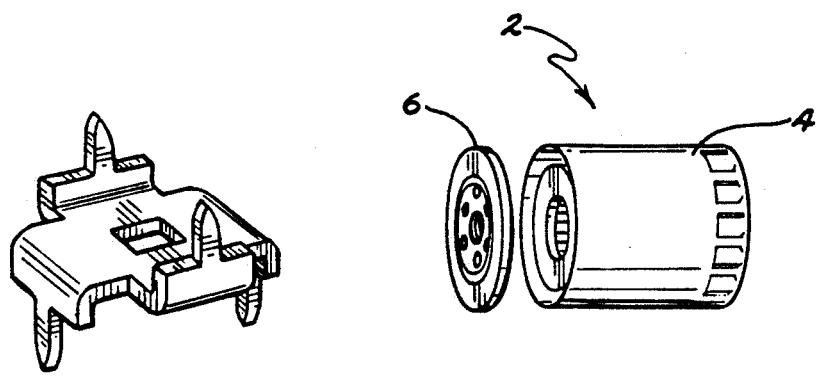

OIL FILTER REMOVAL TOOL

TECHNICAL FIELD

The present invention relates to a tool for removing oil filters and/or filter plates from internal combustion engines.

BACKGROUND OF THE INVENTION

Oil filters are well known for use with internal combustion engines for filtering the oil used to lubricate the engine. Most filters are similar in structure and include a cylindrical filter body attached at one end to a filter plate. The filter plate can be screwed onto the engine to couple the filter to the engine. A suitable porous filter media is contained inside the filter body for removing contaminants as the oil passes through the filter. The filter plate includes a plurality of circumferentially spaced holes arrayed in a circle for allowing the oil to enter or leave the filter body.

A filter wrench comprising an adjustable band is known for removing oil filters when changing oil or the like. This band simply comprises a strap which encircles the filter body and is tightened around the filter body. Then, when the strap or band is turned by means of an attached handle, the filter body is rotated to unscrew the filter from the engine.

Unfortunately, oil filters often become stuck on the engine. The use of the known adjustable band filter wrench often crushes the filter body if the filter is stuck. Then, the filter body has to be sawed or cut off, and the filter plate removed separately using a hammer and screwdriver to slowly rotate the filter plate off. Needless to say, this is a time consuming and frustrating process.

Another known prior art tool is designed to help remove a stuck oil filter plate once the filter body is cut away. This tool has a rectangular base plate with a cylindrical socket projecting upwardly therefrom and two pins projecting downwardly therefrom spaced inwardly from the sides of the base plate. The pins are received in the holes on the oil filter plate and a ratchet wrench is coupled to the socket for turning the base plate and causing the pins to remove the oil filter plate. Various sizes of the tool are provided with the pins being spaced apart different distances.

One disadvantage of the last described tool is that it is relatively expensive to manufacture. The pins have to be welded or otherwise securely attached to the base plate. A socket has to be provided and further secured to the base plate. The need for these manufacturing steps increases the cost and complexity of the tool. In addition, a different tool is required for each filter size. Since there are four common filter sizes (i.e. filters where the holes are located on circles having different diameters), four separate tools are required in a complete set. This also contributes to increased cost.

A final disadvantage of this tool is that it can't be used to remove a complete filter, but only the filter plate. Thus, the mechanic or automobile owner has to have the typical adjustable band filter wrench, or some other tool, to try and remove the filter when the filter body is still attached to the filter plate.

SUMMARY OF THE INVENTION

One aspect of the present invention is to provide a tool for removing oil filters or oil filter plates which is durable and inexpensive to manufacture and/or purchase.

A tool according to this invention can be used for removing an oil filter plate which is secured to an engine. The plate has a plurality of spaced holes arrayed around the circumference of a circle having a first predetermined diameter. The tool comprises a base plate having at least a first pair of spaced tangs integrally formed as part of the base plate and bent outwardly from the base plate to extend therefrom, the tangs terminating in free outer ends which are spaced apart a distance substantially equal to the first diameter to allow the tangs to be received in two diametrically opposite holes in the oil filter plate. In addition, the tool includes means on the base plate for coupling a torque applying member to the base plate to assist in rotating the base plate and the pair of tangs when the tangs are received in the holes in the oil filter plate to unscrew the oil filter plate from the engine.

BRIEF DESCRIPTION OF THE DRAWINGS

The present invention will be described hereafter in the Detailed Description, taken in conjunction with the following drawings, in which like reference numerals refer to like elements or parts throughout.

FIG. 1 is a perspective view of a first embodiment of an oil filter removal tool according to the present invention, illustrating a first model of this tool for removing two different types or sizes of oil filter plates;

FIG. 2 is a perspective view of the first embodiment of an oil filter removal tool according to the present invention, illustrating a second model of this tool for removing two additional types or sizes of oil filter plates, the tools of FIGS. 1 and 2 comprising a complete set of tools according to the first embodiment thereof;

FIG. 3 is a perspective view of the typical components of an oil filter;

FIG. 4 is a perspective view of the tool shown in FIG. 1 being used to remove an oil filter plate;

FIG. 5 is a perspective view of a second embodiment of an oil filter removal tool according to the present invention, illustrating a model of this tool designed for removing complete oil filters;

DETAILED DESCRIPTION

Figure 6:
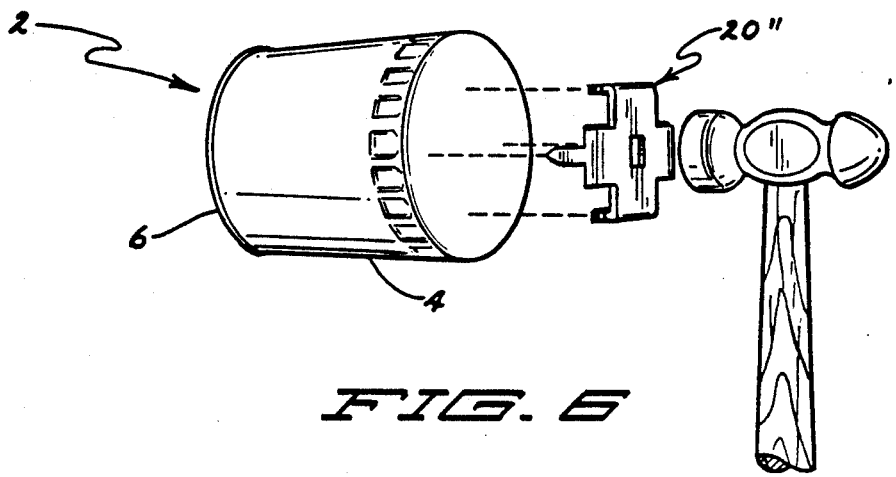
FIG. 6 is a perspective view of the second embodiment of the tool shown in FIG. 5 being applied to an oil filter body.

Referring first to FIGS. 3 and 6, a typical oil filter is illustrated as 2. The structure and function of oil filter 2 is well known and the present invention does not relate to oil filter 2 or its component parts per se. Rather, the present invention relates simply to a tool, indicated generally as 20 in FIG. 1, for helping remove filter 2, or the oil filter plate which is part of filter 2, from an engine. Thus, the structure and function of filter 2 will be described only insofar as is necessary to understand tool 20 of the present invention.

The usual oil filter 2 includes a cylindrical filter body 4 attached at one end to a filter plate 6. Filter plate 6 can be screwed using a threaded attachment 8 onto an internal combustion engine (not shown) to couple filter 2 to the engine. A suitable porous filter media (not shown) is contained inside filter 2 body for removing contaminants as the engine's lubricating oil passes through filter 2. Filter plate 6 includes a plurality of circumferentially spaced holes 10 arrayed in a circle having a diameter illustrated as D in FIG. 4. Holes 10 allow the oil to enter or leave filter body 4 during operation of filter 2.

Different standard sizes of oil filters 2 are provided in the automotive industry. In this regard, the holes 10 in filter plates 6 of different models or types of oil filters 2 will be arranged on circles having different diameters D. Four diameters are typically known, i.e. 1.400 inches, 1.575 inches, 1.675 inches, and 2.350 inches.

Referring now to FIG. 1, a tool 20 according to the present invention comprises a substantially planar base plate 22 having opposed left and right sides 24 and 25, respectively, and opposed front and rear sides 26 and 27, respectively. A square ⅜ inch hole 28 is located in the center of base plate 22. Hole 28 is sized to receive a driver member 30 on a typical ratchet wrench 32 (FIG. 4) to allow a torque wrench 32 to be coupled to base plate 22 to help rotate base plate 22.

A first pair of tangs 34 extend downwardly from the opposed left and right sides 24 and 25 of base plate 22 at the middle thereof. A second pair of tangs 36 extend upwardly from the front and rear sides of base plate 22 at the middle thereof. Tangs 34,36 all terminate in free outer ends 40 spaced away from the plane of base plate 22. Desirably, as will be described hereafter, tangs 34,36 are all sharpened or pointed at their free outer ends.

Tangs 34 in the first pair are spaced apart a distance corresponding to one of the diameters D of the circular hole array in a known oil filter plate, e.g. 2.350 inches. Tangs 36 of the second pair are spaced apart a distance corresponding to one of the other diameters used for the hole arrays in filter plates, e.g. 1.675 inches. Thus, one tool 20 can be used to remove oil filter plates 6 having two different sized hole arrays. Separate tools 20 for each size of oil filter plate 6 are not required.

Tool 20 is easy and inexpensive to manufacture. It is simply stamped out of sheet steel. Tangs 34,36 are integrally formed with base plate 22 and can be bent relative thereto in a forming operation. The torque coupling means, i.e. the square hole 28, is also simply stamped out of base plate 22. Thus, there is no need to fabricate separate pins or sockets and seek to secure those items to a base plate. Tool 20 of the present invention is inexpensive but durable.

FIG. 4 illustrates the use of tool 20 to remove an oil filter plate 6. Typically, such a plate might be stuck in place on the engine. Oil filter plate 6 can be reached by the user of tool 20 by first removing or breaking away the oil filter body 4 therefrom. Since this often happens when removing the oil filter body if the plate is stuck, this is a common situation presented to the auto mechanic or owner.

In any event, once filter plate 6 can be reached, the appropriate sized tool 20 is selected, i.e. the tool 20 in which at least one of the pairs of tangs is at the same distance as the diameter of the hole array in the oil filter plate 6. These tangs have their free outer ends placed in two diametrically opposite holes 10 in the plate, and the ratchet wrench driver 30 is inserted into the coupling hole 28 of base plate 22. Ratchet wrench 32 is then used to apply torque to tool 20, causing base plate 22 to turn and the tangs received in holes 10 to spin or rotate the oil filter plate 6. Filter plate 6 can be spun off quickly in a number of seconds or minutes even if it is stuck quite firmly using tool 20 of this invention.

The advantages of tool 20 are apparent. Stuck oil filter plates 6 can be easily removed without using a screwdriver and hammer to try and rotate it incrementally. This saves considerable time and aggravation. In addition, a single tool can be used for different sizes of oil filter plates, increasing the tool's versatility.

Since four common hole array sizes are found in oil filter plates 6, tool 20 just described will only fit two such sizes. Thus, a second tool 20' will be provided which is generally identical to the first except that the first and second pairs of tangs 34',36' are spaced apart distances equal to the remaining two hole array diameters, e.g. 1.400 and 1.575 inches. Thus, it is contemplated that both tools 20 shown in FIGS. 1 and 2 will be customarily sold together in a single set, though it is certainly possible and within this invention to sell them separately. In fact, each tool 20 could be constructed to have only a single pair of tangs useful for removing only a single sized oil filter plate 6. Many of the various advantages of the present invention will still apply to this tool 20 as well.

In the embodiment shown in FIGS. 1 and 2, tangs 34,36 extend in opposite directions from base plate 22. In other words, tangs 34 in the first pair extend downwardly from base plate 22 and tangs 36 in the second pair extend upwardly. The width of tangs 34 or 36 may be slightly different to allow the tangs to be properly received in holes 10 as holes 10 on different oil filter plates are sized slightly differently. In other words, some holes 10 might have a slightly smaller hole diameter than other holes 10. Thus, whatever pair of tangs 34 or 36 is spaced apart by the necessary distance to allow them to be received in the holes 10 of a particular oil filter plate will also have a width which is slightly less than the hole diameter to allow the tangs to fit into the holes.

A second embodiment of the invention is illustrated in FIG. 5 as 20''. Tool 20'' again is identical in concept and structure to tool 20 of FIG. 1, except that tangs 34'',36'' all extend form base plate 22 in the same direction, i.e. all downwardly or all upwardly. This construction is preferred when considering that feature of the invention which involves the pointed or sharpened nature of tangs 34,36.

Because tangs 34,36 are pointed or sharped at their free outer ends, any of the tools 20 can also be driven or hammered into filter body 4 itself, most preferably into the end of filter body 4. Tangs 34,36 penetrate into and grip filter body 4. Such an operation is illustrated in FIG. 6 with respect to tool 20''.

Then, if the driver member 30 of the wrench 32 is inserted in hole 28, torque can be applied to the entire or complete filter 2 in an attempt to remove filter 2 from the engine. This will often be successful with the entire filter coming off easily. If filter plate 6 is really stuck in the engine, and filter 2 won't budge or filter body 4 gets crushed during the removal process, then filter body 4 can be broken or sawed off. Tool 20 can then be used as described previously to remove oil filter plate 6, i.e. by coupling the appropriately spaced set of tangs 34 or 36 in the holes 10 in filter plate 6.

Thus, the same tool 20 desirably can be used to remove not only stuck oil filter plates 6, but also entire oil filters 2. This further enhances the cost effectiveness of tool 20. The user need only purchase and use this tool 20 and need not have on hand other types of known tools 20, e.g. adjustable band filter wrenches, typically used to remove filters.

Figure 7:
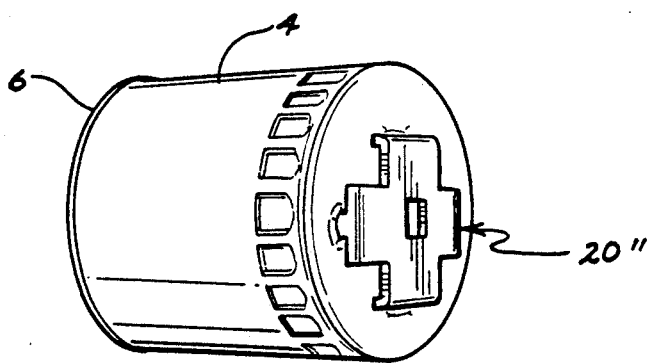
FIG. 7 is a perspective view of the second embodiment of the tool shown in FIG. 5 after this tool is driven into the oil filter body.
Figure 8:
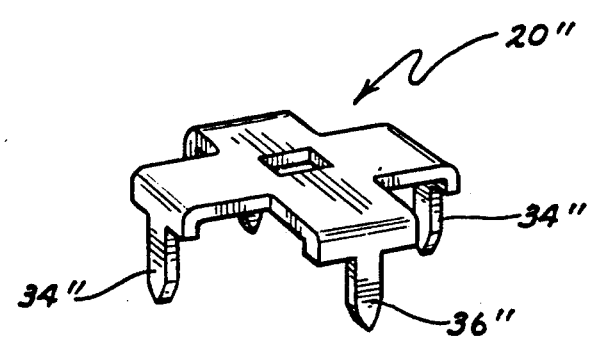

Tool 20'' shown in FIG. 5 is preferred since all of the tangs grip the filter body when tool 20'' is hammered into the body as shown in FIG. 7. Thus, tool 20" has additional purchase or gripping action in body 4 compared to either of the tools 20 or 20' in which only two tangs can be driven into filter body 4. However, these tools 20 and 20' are still effective for removing filter body 4 in the same manner illustrated in FIGS. 6 and 7 and described above.

Tool 20" as illustrated herein is a single use tool designed just for removing complete oil filters as described above. Since tang pairs 34", 36" have different spacing and now extend to the same side, the tangs of one pair can't be received in holes 10 in an oil filter plate without interference from the tangs of the other pair. However, tool 20" could also be used to remove oil filter plates if both pairs of tangs 34" and 36" are spaced apart the same difference to lie on the circumference of the same circle and tangs 34", 36" are circumferentially spaced around that circle in a pattern equal to the circumferential spacing of holes 10. This would allow all four tangs to be received in the holes 10 of the same oil filter plate. In that event, tool 20" could also be used to remove oil filter plates in the same manner as that described for tools 20 and 20'. However, four tools 20" would have to be provided to remove the four standard sizes of oil filter plates.

While the present invention preferably relates to a tool 20 which incorporates the ability to remove both the oil filters 2 and oil filter plates 6, a tool within the scope of this invention could be directed only to a single one of these features. For example, it would not be necessary to have the outer ends of tangs 34,36 be sharpened. Such a tool 20 would still be useful for removing oil filter plates 6, and would be an improvement over the prior art, as long as tangs 34,36 are spaced apart and formed on base plate 22 as previously described. Alternatively, a tool 20 having a number of sharpened tangs would still be useful for being hammered into the oil filter body 4 even if tangs 34,36 weren't spaced to enter into the hole arrays of oil filter plates 6, as is true of tool 20". The present invention, however, includes both types of these tools 20.

Various modifications of this invention will be apparent to those skilled in the art. Thus, the scope of the present invention is to be limited only by the appended claims.

I claim:

1. A tool for removing at least first and second models of oil filter plates from an engine, the first and second models of filter plates having a plurality of spaced holes arrayed around the circumference of a circle having either a first or a second diameter, respectively, which comprises:
   (a) a base plate which includes:
      (i) a first pair of spaced tangs carried on the base plate and extending outwardly therefrom, the tangs of the first pair terminating in free outer ends which are spaced apart a distance substantially equal to the first diameter to allow the tangs to be received in two diametrically opposite holes in the first model of oil filter plate;
      (ii) a second pair of spaced tangs carried on the base plate and extending outwardly therefrom, the tangs of the second pair terminating in free outer ends which are spaced apart a distance substantially equal to the second diameter to allow the tangs to be received in two diametrically opposite holes in the second model of oil filter plate; and
      (iii) wherein the tangs on the first and second pairs are configured relative to one another and relative to the base plate to allow the tangs of the first pair to be received in the diametrically opposite holes of the first model of oil filter plate without interference from the tangs of the second pair and to allow the tangs of the second pair to be received in the diametrically opposite holes of the second model of oil filter plate without interference from the tangs of the first pair; and
   (b) means on the base plate for coupling a torque applying member to the base plate to assist in rotating the base plate and tangs when one pair of the tangs are received in the holes in the appropriate model of oil filter plate to unscrew the oil filter plate from the engine.

2. A tool as recited in claim 1, wherein the first and second pairs of tangs extend outwardly from the base plate in opposite directions such that the first pair of tangs extends upwardly from the base plate and the second pair of tangs extends downwardly from the base plate.

3. A tool as recited in claim 1, wherein the oil filter plate is part of an oil filter which includes a cylindrical filter body that is attached to the oil filter plate, and wherein the free outer ends of the tangs are pointed or sharpened to allow the tangs to be driven into the oil filter body, whereby the tool can also be sued to apply torque to the oil filter body to remove the oil filter as a whole when the oil filter body is still attached to the oil filter plate.

4. A tool as recited in claim 3, wherein the means for coupling the torque applying member comprises a hole in the base plate shaped to receive the driver member of a ratchet wrench, wherein the base plate is substantially planar and the hole lies within the plane of the base plate.

5. A tool for removing an oil filter plate from an engine, the plate having a plurality of spaced holes arrayed around the circumference of a circle having a first pre-determined diameter, which comprises:
   (a) a base plate having at least a first pair of spaced tangs fixedly secured to the base plate and projecting outwardly from the base plate to extend away therefrom, the tangs terminating in free outer ends which are spaced apart a distance substantially equal to the first diameter to allow the tangs to be received in two diametrically opposite holes in the oil filter plate;
   (b) wherein the base plate includes a second pair of spaced tangs fixedly secured to the base plate and projecting outwardly from the base plate to extend away therefrom, the tangs of the second pair terminating in free outer ends which are spaced apart a distance substantially equal to a second diameter which is different from the first diameter to allow the tangs to be received in two diametrically opposite holes in a differently sized oil filter plate having the holes thereof arrayed in a circle having the second diameter, whereby a single tool can be used to remove oil filter plates in which the holes are arrayed in circles having either the first or the second diameter;
   (c) wherein the first and second pairs of tangs extend outwardly from the base plate in opposite directions such that the first pair of tangs extends upwardly from the base plate and the second pair of tangs extends downwardly from the base plate; and (d) means on the base plate for coupling a torque applying member to the base plate to assist in rotating the base plate and the tangs when the tangs are received in the holes in the oil filter plate to unscrew the oil filter plate from the engine.

6. A tool as recited in claim 1, wherein the oil filter plate is part of an oil filter which includes a cylindrical filter body that is attached to the oil filter plate, and wherein the free outer ends of the tangs are pointed or sharpened to allow the tangs to be driven into the oil filter body, whereby the tool can also be used to apply torque to the oil filter body to remove the oil filter as a whole when the oil filter body is still attached to the oil filter plate.

7. A tool as recited in claim 1, wherein the means for coupling the torque applying member comprises a hole in the base plate shaped to receive the driver member of a ratchet wrench, wherein the base plate is substantially planar and the hole lies within the plane of the base plate.

8. A tool as recited in claim 1, wherein the tangs in the first and second pairs thereof are formed integrally with the base plate and are bent outwardly from the base plate.

9. A tool as recited in claim 1, wherein the base plate is rectangular having opposed left and right sides and opposed front and rear sides, and wherein the first pair of tangs is bent outwardly from the base plate along the left and right sides thereof and the second pair of tangs is bent outwardly from the base plate along the front and rear sides thereof.

10. A tool as recited in claim 9, wherein the tangs connect to the base plate approximately in the middle of each side of the base plate.

11. A tool as recited in claim 10, wherein the means for coupling the torque applying member comprises a hole in the base plate shaped to receive the driver member of a ratchet wrench, wherein the base plate is substantially planar and the hole lies within the plane of the base plate.

12. A tool as recited in claim 11, wherein the oil filter plate is part of an oil filter which includes a cylindrical filter body that is attached to the oil filter plate, and wherein the free outer ends of the tangs are pointed or sharpened to allow the tangs to be driven into the oil filter body, whereby the tool can also be used to apply torque to the oil filter body to remove the oil filter as a whole when the oil filter body is still attached to the oil filter plate.

* * * * *